United States Patent
Tuduki et al.

(10) Patent No.: US 11,005,090 B2
(45) Date of Patent: *May 11, 2021

(54) NEGATIVE ELECTRODE FOR NON-AQUEOUS ELECTROLYTE SECONDARY BATTERIES, AND NON-AQUEOUS ELECTROLYTE SECONDARY BATTERY

(71) Applicant: Panasonic Intellectual Property Management Co., Ltd., Osaka (JP)

(72) Inventors: Kouhei Tuduki, Hyogo (JP); Takashi Ko, Hyogo (JP); Fumiharu Niina, Hyogo (JP); Katsunori Yanagida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 45 days.

This patent is subject to a terminal disclaimer.

(21) Appl. No.: 16/466,126

(22) PCT Filed: Dec. 4, 2017

(86) PCT No.: PCT/JP2017/043396
§ 371 (c)(1),
(2) Date: Jun. 3, 2019

(87) PCT Pub. No.: WO2018/105539
PCT Pub. Date: Jun. 14, 2018

(65) Prior Publication Data
US 2020/0067074 A1 Feb. 27, 2020

(30) Foreign Application Priority Data
Dec. 8, 2016 (JP) .............................. JP2016-238721

(51) Int. Cl.
*H01M 4/133* (2010.01)
*H01M 4/62* (2006.01)
*H01M 10/0525* (2010.01)
*H01M 4/02* (2006.01)

(52) U.S. Cl.
CPC .......... *H01M 4/133* (2013.01); *H01M 4/622* (2013.01); *H01M 10/0525* (2013.01); *H01M 2004/027* (2013.01); *H01M 2004/028* (2013.01)

(58) Field of Classification Search
CPC .. H01M 4/133; H01M 4/622; H01M 10/0525; H01M 2004/027; H01M 2004/028; H01M 4/13; H01M 4/36; H01M 4/366; H01M 4/587; Y02E 60/10
See application file for complete search history.

(56) References Cited

U.S. PATENT DOCUMENTS

| | | | |
|---|---|---|---|
| 2013/0157130 A1 | 6/2013 | Tamaki et al. | |
| 2018/0183042 A1 | 6/2018 | Tuduki et al. | |
| 2019/0177551 A1* | 6/2019 | Nagai | ...................... H01B 1/24 |

FOREIGN PATENT DOCUMENTS

| | | |
|---|---|---|
| JP | H10-21925 A | 1/1998 |
| JP | 2004-134304 A | 4/2004 |
| JP | 2011-192620 A | 9/2011 |
| JP | 2012-015051 A | 1/2012 |
| JP | 2012-221568 A | 11/2012 |
| WO | 2012/026009 A1 | 3/2012 |
| WO | 2017/056448 A1 | 4/2017 |

OTHER PUBLICATIONS

International Search Report dated Jan. 16, 2018, issued in counterpart application No. PCT/JP2017/043396, with English translation. (4 pages).

* cited by examiner

*Primary Examiner* — Muhammad S Siddiquee
(74) *Attorney, Agent, or Firm* — Westerman, Hattori, Daniels & Adrian, LLP (57) ABSTRACT

This non-aqueous electrolyte secondary battery is provided with: a wound electrode body which comprises a positive electrode, a negative electrode and a separator, and wherein the positive electrode and the negative electrode are wound into a roll, with the separator being interposed therebetween; and a non-aqueous electrolyte. The negative electrode comprises a negative electrode collector and a negative electrode mixture layer that is formed on the negative electrode collector. The negative electrode mixture layer contains graphite, a carbon material that has a BET specific surface area of 10 $m^2/g$ or more, said BET specific surface area being larger than that of the graphite, and a hydrophobic binder. The coverage of the particle surfaces of the carbon material by the binder is higher than the coverage of the particle surfaces of the graphite by the binder.

8 Claims, 1 Drawing Sheet

NEGATIVE ELECTRODE FOR NON-AQUEOUS ELECTROLYTE SECONDARY BATTERIES, AND NON-AQUEOUS ELECTROLYTE SECONDARY BATTERY

TECHNICAL FIELD

The present disclosure relates to a negative electrode for a non-aqueous electrolyte secondary battery, and a non-aqueous electrolyte secondary battery.

BACKGROUND ART

Patent Literature 1 discloses a negative electrode for a non-aqueous electrolyte secondary battery using, as a binder, a fibrillated polymer fiber of a cellulose-based fiber or the like. Patent Literature 1 describes that good cycle characteristics of a battery can be obtained because adhesion of a mixture layer to a collector is thus improved.

CITATION LIST

Patent Literature

PATENT LITERATURE 1: International Publication No. WO2012/206009

SUMMARY

It is a significant problem, in a non-aqueous electrolyte secondary battery, to improve the input characteristic thereof. There is room for improvement in the input characteristic of a battery in the conventional techniques including that described in Patent Literature 1.

A negative electrode for a non-aqueous electrolyte secondary battery according to one aspect of the present disclosure includes a negative collector and a negative electrode mixture layer formed on the negative collector. The negative electrode mixture layer contains graphite, a carbon material having a BET specific surface area larger than that of the graphite and of 10 $m^2/g$ or more, and a hydrophobic binder, and a coverage of particle surface of the carbon material with the binder is higher than a coverage of particle surface of the graphite with the binder.

A non-aqueous electrolyte secondary battery according to one aspect of the present disclosure includes the aforementioned negative electrode, a positive electrode and a non-aqueous electrolyte, in which the positive electrode contains a first positive electrode active material, a second positive electrode active material, and a phosphate compound. The first positive electrode active material has a pore volume, of pores each having a pore diameter of 100 nm or less, per mass of 8 $mm^3/g$ or more, and the second positive electrode active material has a pore volume, of pores each having a pore diameter of 100 nm or less, per mass of 5 $mm^3/g$ or less. The pore volume, of pores each having a pore diameter of 100 nm or less, per mass of the first positive electrode active material is 4 or more times the pore volume, of pores each having a pore diameter of 100 nm or less, per mass of the second positive electrode active material.

According to the negative electrode for a non-aqueous electrolyte secondary battery according to one aspect of the present disclosure, a non-aqueous electrolyte secondary battery having an excellent input characteristic can be provided.

DESCRIPTION OF EMBODIMENTS

A negative electrode for a non-aqueous electrolyte secondary battery according to one aspect of the present disclosure includes, in addition to graphite and a hydrophobic binder, a negative electrode mixture layer containing a carbon material having a BET specific surface area larger than that of the graphite and of 10 $m^2/g$ or more (hereinafter referred to as the "carbon material A"). The carbon material A functions as a negative electrode active material similarly to the graphite, and has a coverage of particle surface with the binder higher than a coverage of the graphite. Incidentally, graphite used as a negative electrode active material generally has a BET specific surface area of 10 $m^2/g$ or less, and many of reactive sites are present on particle surface. Therefore, if a binder distribution in the mixture layer is simply homogenized for increasing adhesion of an electrode plate (adhesion between components in the mixture layer and adhesion between the mixture layer and a collector) and thus the particle surface of the graphite is covered with a large amount of the binder, the battery reaction is inhibited, resulting in lowering the input characteristic.

On the contrary, in using the carbon material A having a large specific surface area, even if a large amount of the binder adheres to the particle surface, inside portions of the particles can be used for the battery reaction. Besides, the carbon material A covered with a large amount of the binder functions as a good adhesion point between graphite particles, and the adhesion of the electrode plate is thus improved. In other words, according to the negative electrode for a non-aqueous electrolyte secondary battery according to one aspect of the present disclosure, the input characteristic of the battery can be greatly improved while sufficiently obtaining good adhesion of the electrode plate.

Now, as an exemplified embodiment, a non-aqueous electrolyte secondary battery 10 of a cylindrical battery including a cylindrical metal case is exemplarily described, but it is noted that the non-aqueous electrolyte secondary battery of the present disclosure is not limited to this exemplified battery. The non-aqueous electrolyte secondary battery of the present disclosure may be, for example, a rectangular battery including a rectangular metal case, a laminate battery including a package made of a resin sheet, or the like. Besides, although an electrode assembly 14 having a wound structure is exemplarily described as an electrode assembly, the electrode assembly may have a laminated structure formed by alternately laminating a plurality of positive electrodes and a plurality of negative electrodes with separators disposed therebetween.

Figure 1:
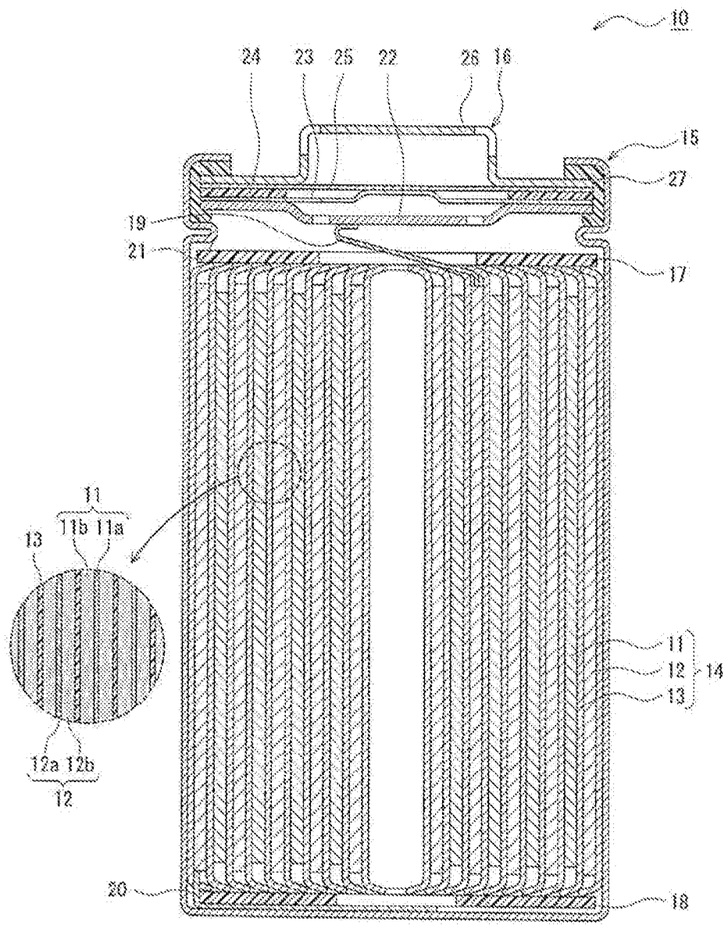
FIG. 1 is a sectional view of a non-aqueous electrolyte secondary battery described as an exemplary embodiment.

FIG. 1 is a sectional view of the non-aqueous electrolyte secondary battery 10. As exemplarily illustrated in FIG. 1, the non-aqueous electrolyte secondary battery 10 includes the electrode assembly 14 having the wound structure and a non-aqueous electrolyte (not shown). The electrode assembly 14 includes a positive electrode 11, a negative electrode 12 and a separator 13, and the positive electrode 11 and the negative electrode 12 are spirally wound with the separator 13 disposed therebetween. Hereinafter, a direction toward one side along the axial direction of the electrode assembly 14 is sometimes referred to as an "upper" side with a direction toward another side along the axial direction referred to as a "lower" side in some cases.

All of the positive electrode 11, the negative electrode 12 and the separator 13 included in the electrode assembly 14 are formed in an elongated shape. When these members are spirally wound, these members are alternately laminated in the radial direction of the electrode assembly 14. In the electrode assembly 14, a lengthwise direction of each electrode corresponds to a winding direction, and a widthwise direction of each electrode corresponds to the axial direction. A positive electrode lead 19 electrically connecting the positive electrode 11 to a positive terminal is connected, for example, to a center portion in the lengthwise direction of the positive electrode 11, and extends out beyond the upper end of the electrode group. A negative electrode lead 20 electrically connecting the negative electrode 12 to a negative terminal is connected, for example, to an end in the lengthwise direction of the negative electrode 12, and extends out beyond the lower end of the electrode group.

In the example illustrated in FIG. 1, a case body 15 and a sealing assembly 16 together constitute a metal battery case housing the electrode assembly 14 and the non-aqueous electrolyte. Insulating electrode plates 17 and 18 are provided respectively on the upper and lower sides of the electrode assembly 14. The positive electrode lead 19 passes through a through-hole of the insulating electrode plate 17, extends toward the sealing assembly 16, and is welded to the lower surface of a filter 22 corresponding to a bottom board of the sealing assembly 16. In the non-aqueous electrolyte secondary battery 10, a cap 26 of the sealing assembly 16 electrically connected to the filter 22 works as the positive terminal. On the other hand, the negative lead 20 extends toward a bottom of the case body 15 and is welded to an inner surface of the bottom of the case body 15. In the non-aqueous electrolyte secondary battery 10, the case body 15 works as the negative terminal.

The case body 15 is a cylindrical metal container having a closed-end. A gasket 27 is disposed between the case body 15 and the sealing assembly 16 to ensure that the battery case is tightly sealed. The case body 15 includes a projecting portion 21 formed by, for example, pressing the lateral surface from outside to support the sealing assembly 16. The projecting portion 21 is preferably formed annularly along the circumferential direction of the case body 15, so as to support the sealing assembly 16 on the upper surface thereof.

The sealing assembly 16 has a structure in which the filter 22, a lower vent member 23, n insulating member 24, an upper vent member 25 and the cap 26 are successively laminated from the side of the electrode assembly 14. The respective members constituting the sealing assembly 16 are in the shape of, for example, a disk or a ring, and these members excluding the insulating member 24 are electrically connected to one another. The lower vent member 23 and the upper vent member 25 are connected to each other at the center portions thereof, and the insulating member 24 is disposed between peripheral portions thereof. Since the lower vent member 23 is provided with a venthole, if a battery internal pressure increases due to abnormal heat generation, the upper vent member 25 swells toward the cap 26 to be spaced from the lower vent member 23, and thus, the electric connection therebetween is broken. If the internal pressure further increases, the upper vent member 25 ruptures, and gas is discharged from an opening of the cap 26.

Now, each of the components (the positive electrode 11, the negative electrode 12 and the separator 13) of the electrode assembly 14 and the non-aqueous electrolyte will be described in detail.

[Positive Electrode]

The positive electrode 11 includes a positive collector 11a, and a positive electrode mixture layer 11b formed on the positive collector 11a. For the positive collector 11a, a foil of a metal such as aluminum that is stable in the electric potential range of the positive electrode 11, a film with such a metal disposed as an outer layer, and the like can be used. The positive electrode mixture layer 11b contains a positive electrode active material, a conductive agent and a binder. The positive electrode 11 can be produced, for example, by coating both surfaces of the positive collector 11a with a positive electrode mixture slurry containing the positive electrode active material, the conductive agent, the binder and the like, drying the thus obtained coated film, and compressing the resultant to form the positive electrode mixture layer 11b on the both surfaces of the collector.

The positive electrode mixture layer 11b is formed on, for example, the whole region of the both surfaces of the positive collector 11a excluding a portion where the positive electrode lead 19 is welded. The thickness of the positive electrode mixture layer 11b is not especially limited, and is preferably 30 μm to 150 μm on one surface of the positive collector 11a. An example of the positive electrode active material includes a lithium-containing transition metal oxide containing a metal element such as Ni, Co, Mn or Al. Incidentally, as the positive electrode active material, one lithium-containing transition metal oxide may be used, or a plurality of lithium-containing transition metal oxides may be used.

The positive electrode active material may have pores inside the particle, and the positive electrode mixture layer 11b may contain first and second positive electrode active materials different in the pore volume, and a phosphate compound. If a positive electrode active material containing a large number of pores is used, a decomposed product is easily generated through, for example, a side reaction, and hence a high-resistance coating film is formed on the surface of the negative electrode 12, but the formation of such a high-resistance coating film can be suppressed by using the phosphate compound and the carbon material A to which a large amount of the hydrophobic binder adheres in the negative electrode 12. Owing to a combination of the positive electrode active material containing a large number of pores and the negative electrode 12, the input characteristic of the battery can be possibly further improved.

In an exemplified embodiment, the first positive electrode active material has a pore volume, of pores each having a pore diameter of 100 nm or less, per mass of the active material (hereinafter referred to as the "100 nm or less pores volume") of 8 $mm^3/g$ or more, and the second positive electrode active material has a pore volume, of pores each having a pore diameter of 100 nm or less, per mass of the active material (the 100 nm or less pores volume) of 5 $mm^3/g$ or less. Besides, a ratio of the 100 nm or less pores volume of the first positive electrode active material to the 100 nm or less pores volume of the second positive electrode active material (hereinafter referred to as the "the first/second pore volume ratio") may be 4 or more. The 100 nm or less pores volume can be measured in accordance with the BJH method using, for example, a device for measuring an amount of a gas adsorbed (manufactured by Quantachrome Corporation).

A content of the first positive electrode active material in the positive electrode mixture layer 11b is, for example, 30 mass % or less based on the total amount of the first and second positive electrode active materials. The upper limit of the 100 nm or less pores volume of the first positive electrode active material is not especially limited but preferably 100 mm³/g or less. Besides, the 100 nm or less pores volume of the first positive electrode active material is preferably 10 mm³/g or more, and more preferably 15 mm³/g or more. The 100 nm or less pores volume of the second positive electrode active material is preferably 3 mm³/g or less, and more preferably 2 mm³/g or less.

An average particle diameter of the positive electrode active material (including the first and second positive electrode active materials; the same applies hereinafter) is, for example, 2 μm or more and less than 30 μm. The average particle diameter of a positive electrode active material refers to a volume average particle diameter measured according to a laser diffraction method, and means a median diameter at which the cumulative volume is 50% in the particle diameter distribution. The positive electrode active material may be in the form of secondary particles that are formed of agglomerated primary particles. An average particle diameter of the primary particles constituting the first positive electrode active material is, for example, 500 nm or less, and is smaller than the average particle diameter of primary particles constituting the second positive electrode active material. The average particle diameter of the primary particles can be determined as follows: In the observation under a scanning electron microscope (SEM), 100 particles of the positive electrode active material are arbitrarily selected; the average of the lengths of the major axis and the minor axis of each particle is determined as the particle diameter of the each particle; and the average of the particle diameter of the 100 particles is determined as the average particle diameter of the primary particles.

As the positive electrode active material, for example, a lamellar lithium transition metal oxide is used. A preferable example of the positive electrode active material includes a lamellar lithium transition metal oxide represented by a general formula: $Li_{1+x}M_aO_{2+b}$ (wherein x+a=1, −0.2≤x≤0.2, −0.1≤b≤0.1, and M represents a metal element containing at least one selected from Ni, Co, Mn and Al). The lamellar lithium transition metal oxide may contain another element in addition to Ni, Co, Mn and Al, and may contain, for example, Zr.

The positive electrode active material can be synthesized by, for example, mixing, in an intended mixing ratio, a lithium-containing compound such as lithium hydroxide with an oxide obtained by firing a hydroxide containing a metal element M other than Li, and firing the thus obtained mixture. The 100 nm or less pores volumes of the first and second positive electrode active materials can be adjusted in preparing the hydroxide containing the metal element M. The hydroxide is obtained by, for example, adding an alkaline aqueous solution of sodium hydroxide or the like in a dropwise manner to an aqueous solution containing a compound of the metal element M, and stirring the resultant, and at this time, the temperature of the aqueous solutions, the time duration for the dropwise addition of the alkaline aqueous solution, the stirring rate, pH, and the other conditions are adjusted. Besides, the average particle diameter of the primary particles can be regulated by adjusting the firing temperature within a range from 700° C. to 1000° C. for the first positive electrode active material and a range from 800° C. to 1100° C. for the second positive electrode active material.

The phosphate compound may be contained in the positive electrode mixture layer 11b, preferably adheres to the surface of the first positive electrode active material, and a ratio of the phosphate compound adhering to the particle surface of the first positive electrode active material is set to be higher than a ratio of the phosphate compound adhering to the particle surface of the second positive electrode active material.

A content of the phosphate compound in the positive electrode mixture layer 11b is, for example, 0.1 mass % to 5 mass % based on the total amount of the positive electrode active material. The particle diameter of the phosphate compound is preferably smaller than the particle diameter of the first and second positive electrode active materials, and is, for example, 50 nm to 10 μm. The average particle diameter of the phosphate compound is determined as follows: In the observation under a scanning electron microscope (SEM), 100 particles of the phosphate compound are arbitrarily selected; the largest major axes of the respective particles are measured; and the average of the measured values is determined as the particle diameter of the phosphate compound.

The phosphate compound contained in the positive electrode mixture layer 11b is not especially limited as long as it is a phosphate-containing compound, such as phosphoric acid or a phosphate salt, and examples thereof include lithium phosphate, lithium dihydrogen phosphate, cobalt phosphate, nickel phosphate, manganese phosphate, potassium phosphate, calcium phosphate, sodium phosphate, magnesium phosphate, ammonium phosphate, and ammonium dihydrogen phosphate. One of these may be singly used or two or more of these may be used in combination. The phosphate compound may be present in the form of a hydrate. In particular, lithium phosphate is preferably used, and trilithium phosphate ($Li_3PO_4$) is particularly preferably used.

Examples of the conductive agent contained in the positive electrode mixture layer 11b include carbon materials such as carbon black, acetylene black, Ketchen black and graphite. Examples of the binder contained in the positive electrode mixture layer 11b include fluororesins such as polytetrafluoroethylene (PTFE) and polyvinylidene fluoride (PVdF), polyacrylonitrile (PAN), a polyimide resin, an acrylic resin and a polyolefin resin. These resins may be used together with a cellulose derivative such as carboxymethyl cellulose (CMC) or a salt thereof, polyethylene oxide (PEO), or the like.

[Negative Electrode]

The negative electrode 12 includes a negative collector 12a, and a negative electrode mixture layer 12b formed on the negative collector 12a. The negative collector 12a has a thickness of, for example, 5 μm to 20 μm. For the negative collector 12a, a foil of a metal such as copper that is stable in the electric potential range of the negative electrode 12, a film with such a metal disposed as an outer layer, and the like can be used. The negative electrode mixture layer 12b contains graphite, the carbon material having a BET specific surface area larger than that of the graphite and of 10 m²/g or more (the carbon material A), and a hydrophobic binder. The negative electrode 12 can be produced, for example, by coating both surfaces of the negative collector 12a with a negative electrode mixture slurry containing the graphite, the carbon material A, the binder and the like, drying the thus obtained coated film, and compressing the resultant to form the negative electrode mixture layer 12b on the both surfaces of the collector.

The negative electrode mixture layer 12b is formed on, for example, the whole region of the both surfaces of the negative collector 12a excluding a portion where the negative electrode lead 20 is welded. The thickness of the negative electrode mixture layer 12b is not especially limited, and is preferably 30 μm or more, and more preferably 50 µm or more on one surface of the negative collector 12a. The thickness of the negative electrode mixture layer 12b is, for example, 30 µm to 150 µm. If the thickness of the negative electrode mixture layer 12b is too small, for example, a proportion occupied by the graphite in the thickness becomes so large that the effect of improving the adhesive force of the electrode plate owing to the binder A is reduced.

A content of the carbon material A in the negative electrode mixture layer 12b is, for example, 20 mass % or less based on the total mass of the graphite. The content of the carbon material A is preferably 0.5 mass % to 15 mass %, and more preferably 1 mass % to 10 mass % based on the total mass of the graphite. The content of the carbon material A is, for example, 1 mass % to 10 mass % based on the total mass of the negative electrode mixture layer 12b. The carbon material A having a large BET specific surface area tends to have large irreversible capacity at the time of initial charge discharge, and if the content of the carbon material A is too large, the energy density of a reversibly usable battery may be lowered in some cases.

In an exemplified embodiment, a distribution of the graphite, the carbon material A and the binder in the negative electrode mixture layer 12b is substantially homogeneous. For example, assuming that the negative electrode mixture layer 12b is divided into two portions at the center in the thickness direction, a ratio of the content of the carbon material A in the portion closer to the negative collector 12a to the content of the carbon material A in the surface portion of the negative electrode mixture layer 12b is 0.9 to 1.1.

The graphite reversibly intercalates and deintercalates lithium ions, and functions as the negative electrode active material. The graphite may be either natural graphite or artificial graphite. The average particle diameter of the graphite is, for example, 10 µm to 30 µm, or 15 µm to 30 µm, and is preferably larger than the average particle diameter of the carbon material A. The average particle diameter of graphite refers to a volume average particle diameter measured according to the laser diffraction method, and means a median diameter at which the cumulative volume value is 50% in the particle diameter distribution (hereinafter, the same applies to the average particle diameter of the carbon material A).

As the graphite, one having a BET specific surface area of 15 $m^2/g$ or less is used, and one having that of 10 $m^2/g$ or less is generally used. A suitable example of the BET specific surface area of the graphite is 1 $m^2/g$ to 10 $m^2/g$. The BET specific surface area of the graphite is smaller than the BET specific surface area of the carbon material A, and many of reactive sites are present on the particle surface in the graphite. The BET specific surface area of graphite refers to a surface area per mass of graphite measured in accordance with a BET method, and can be measured using a device for measuring a BET specific surface area by nitrogen adsorption/desorption ("TriStar II 3020" manufactured by Shimadzu Corporation) (hereinafter, the same applies to the BET specific surface area of the carbon material A).

The carbon material A reversibly intercalates and deintercalates lithium ions, and functions as the negative electrode active material similarly to the graphite. The carbon material A contains carbon as a principal component, and may have a BET specific surface area larger than that of the graphite and of 10 $m^2/g$ or more. Preferable examples of the carbon material A include carbon black, acetylene black and Ketchen black. The carbon material A is present in a large amount, for example, among the graphite particles in the negative electrode mixture layer 12b.

The average particle diameter of the carbon material A is preferably 5 µm or more, and more preferably 10 µm or more. The average particle diameter of the carbon material A is, for example, 5 µm to 20 µm, and is smaller than the average particle diameter of the graphite. If the average particle diameter of the carbon material A satisfies this condition, the carbon material A is easily present among the graphite particles, and hence good adhesion of the electrode plate can be easily obtained. The carbon material A may be in the form of secondary particles that are formed of agglomerated primary particles. The average particle diameter of the primary particles is, for example, 0.01 µm to 1 µm. It is noted that the term secondary particles herein means particles not separated into primary particles even when subjected to ultrasonic vibration.

The BET specific surface area of the carbon material A is 10 $m^2/g$ or more as described above, preferably 20 $m^2/g$ or more, and more preferably 30 $m^2/g$ or more. The upper limit of the BET specific surface area of the carbon material A is not especially limited, but is, for example, 100 $m^2/g$ in consideration of battery capacity, cycle characteristics and the like. The carbon material A has a larger number of pores inside the particles than the graphite, and the average pore diameter is preferably 1 µm or less. A suitable example of the average pore diameter is 0.1 µm to 1 µm. The pores of the carbon material A are formed, for example, among the primary particles constituting the secondary particles.

The negative electrode mixture layer 12b may contain, as the negative electrode active material, merely the graphite and the carbon material A, or may contain another negative electrode active material in addition to the graphite and the carbon material A. Examples of another negative electrode active material include a metal alloying with lithium, such as silicon (Si) or tin (Sn), and an oxide containing a metal element of Si, Sn or the like (such as silicon oxide represented by $SiO_x$). If another negative electrode active material is contained in the negative electrode mixture layer 12b, the BET specific surface area of the material is preferably smaller than the specific surface area of the carbon material A and is 15 $m^2/g$ or less. Besides, the content thereof is preferably smaller than that of the graphite.

The hydrophobic binder contained in the negative electrode mixture layer 12b (hereinafter referred to as the "binder B") is constituted of a hydrophobic resin not dissolved in water. A difference in an HSP value between the binder B and water is, for example, 10 or more. The HSP value is an index of solubility calculated based on three parameters of the London dispersion force, the dipole-dipole force and the hydrogen bonding force, the solubility is predicted based on the sum of differences in these parameters between a solvent and a solute, and the solubility is presumed to be lower as the sum of the numerical differences is larger. The negative electrode mixture layer 12b may contain, in addition to the binder B, CMC or a salt thereof, polyacrylic acid (PAA) or a salt thereof, polyvinyl alcohol (PVA) or the like.

The binder B may be any binder as long as it satisfactorily adheres to the particle surface of the graphite and the carbon material A used as the negative electrode active material and to the negative collector 12a, and examples thereof include rubber binders such as high styrene rubber, ethylene propylene rubber, butyl rubber, chloroprene rubber, butadiene rubber, isoprene rubber, styrene butadiene rubber (SBR), acrylonitrile butadiene rubber, acrylonitrile rubber, fluoro-rubber, acrylic rubber and silicone rubber. In particular, the binder B preferably contains SBR, and the binder B may be constituted of substantially SBR alone. The binder B of SBR or the like is present, for example, on the particle surface of the graphite and the carbon material A in the form of particles having a particle diameter of 1 μm or less. Since the binder B is unlikely to enter the particle of the carbon material A, the inside portion of the particle of the carbon material A can be used for the battery reaction even if a large amount of the binder B adheres to the particle surface of the carbon material A.

The coverage of the particle surface of the carbon material A with the binder B is higher than the coverage of the particle surface of the graphite with the binder B as described above. Here, the coverage with the binder B refers to a ratio of an area covered with the binder B to the total area on each particle surface of the carbon material A or the graphite. In other words, the ratio of the area on the particle surface where the binder B adheres is larger in the carbon material A than in the graphite. When the binder B is thus caused to exist, an amount of the binder B adhering to the particle surface of the graphite uselessly without contributing to the adhesion improvement of the electrode plate can be reduced to improve the input characteristic of the battery. In the negative electrode mixture layer 12b, the graphite particles can be strongly bonded to one another by the carbon material A covered with a large amount of the binder B and present among the graphite particles, and the graphite particles and the negative collector can be strongly bonded to each other.

The coverage of the particle surface of the carbon material A with the binder B can be measured through observation, through scanning electron microscope/energy dispersive X-ray spectroscopy (SEM/EDX), of the surface of the negative electrode mixture layer 12b having been stained with a stain such as bromine (hereinafter, the same applies to the coverage of the graphite). Through the SEM/EDX observation, the total area of the particle surface of the carbon material A and an area of the particle surface of the carbon material A where the binder B adheres are respectively measured, based on which the coverage with the binder B is calculated.

A ratio of the coverage of the particle surface of the graphite with the binder B to the coverage of the particle surface of the carbon material A with the binder B (hereinafter referred to as the "binder coverage ratio") is, for example, 0.9 or less, or 0.8 or less. A suitable example of the binder coverage ratio is preferably 0.5 to 0.9, and more preferably 0.7 to 0.9. When the binder coverage ratio falls in this range, the good adhesion of the electrode plate and the input characteristic of the battery can be both easily attained. The coverage of the particle surface of the carbon material A with the binder B is, for example, 1% to 20%, and preferably 1% to 10%.

All the graphite and the carbon material A need not satisfy the above-described relationship regarding the binder coverage ratio, and at least 50% or more of the graphite and the carbon material A preferably satisfy the above-described relationship. For example, substantially all the graphite and the carbon material A may have a binder coverage ratio of 0.7 to 0.9.

As a method for realizing the aforementioned binder coverage ratio, for example, a method in which the carbon material A and the binder B are precedently mixed in the preparation of the negative electrode mixture slurry for causing the binder B to adhere to the particle surface of the carbon material A priorly to the graphite may be employed. For example, the carbon material A and the binder B are precedently mixed in an aqueous dispersion medium, and then the graphite is added thereto to prepare the negative electrode mixture slurry. In mixing the carbon material A and the binder B precedently, the amount of the binder B to be added may be increased to increase its share in mixing. The share in mixing may be increased, for example, by mixing these with a solid content concentration increased by reducing the amount of the dispersion medium, or by using a mixer capable of applying high shearing force, such as a pressure homogenizer or a thin-film spin system high-speed mixer (such as "FILMIX" manufactured by PRIMIX Corporation).

The negative electrode mixture layer 12b includes a first layer and a second layer formed successively from the side of the negative collector 12a, and the content of the carbon material A in the first layer may be set to be higher than the content of the carbon material A in the second layer. Assuming that the negative electrode mixture layer 12b is divided into two portions at the center in the thickness direction, the content of the carbon material A in the surface portion of the negative electrode mixture layer 12b (the second layer) may be less than 90% of the content of the carbon material A in the portion closer to the negative collector 12a (the first layer). A decomposition reaction product from the positive electrode 11 may be deposited on the surface of the negative electrode mixture layer 12b, and the decomposed product and the binder B may together form a high-resistance coating film in some cases. In such cases, the input characteristic of the battery can be further improved in some cases by lowering, in the surface portion of the negative electrode mixture layer 12b, the content of the carbon material A to which a large amount of the binder B adheres.

[Separator]

An ion-permeable and insulating porous sheet is used as the separator 13. Specific examples of the porous sheet include a microporous thin film, woven fabric, and nonwoven fabric. Suitable examples of the material for the separator 13 include olefin resins such as polyethylene and polypropylene, and cellulose. The separator 13 may have either a single layer structure or a multi-layer structure. A heat-resistant layer containing a heat-resistant material may be formed on the surface of the separator 13.

[Non-aqueous Electrolyte]

The non-aqueous electrolyte contains a non-aqueous solvent and an electrolyte salt dissolved or dispersed in the non-aqueous solvent. Example of the non-aqueous solvent include esters, ethers, nitriles such as acetonitrile, amides such as dimethylformamide, and mixed solvents of two or more of these solvents. The non-aqueous solvent may contain a halogen-substituted product formed by replacing at least one hydrogen atom of any of the above-described solvents with a halogen atom such as fluorine.

Examples of the esters include cyclic carbonate esters such as ethylene carbonate (EC), propylene carbonate (PC), and butylene carbonate; chain carbonate esters such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogen-substituted product include a fluorinated cyclic carbonate ester such as fluoroethylene carbonate (FEC), a fluorinated chain carbonate ester, a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}$, $(CnF_{2n+1})_x$ (wherein 1<x<6, and n is 1 or 2), $LiB_{10}Cl_{10}$, LiCl, LiBr, LiI, chloroborane lithium, lithium short-chain aliphatic carboxylates; borate salts such as $Li_2B_4O_7$, $Li(B(C_2O_4)_2)$, and $Li(B(C_2O_4)F_2)$; and imide salts such as $LiN(SO_2CF_3)_2$ and $LiN(C_lF_{2l+1}SO_2)(C_mF_{2m+1}SO_2)$ (wherein l and m are integers of 1 or more). A single one of these lithium salts may be used or a mixture of a plurality of these may be used. Among these lithium salts, $LiPF_6$ is preferably used from the viewpoint of ionic conductivity, electrochemical stability and the like. A concentration of the lithium salt is preferably 0.8 mol to 1.8 mol per L of the non-aqueous solvent.

EXAMPLES

The present disclosure will now be described in more details by way of examples, and it is noted that the present disclosure is not limited to these examples.

Example 1

[Production of Positive Electrode]

A positive electrode mixture slurry was prepared by mixing 91 parts by mass of a lithium-containing transition metal oxide (a positive electrode active material) represented by $Li_{1.067}Ni_{0.464}Co_{0.186}Mn_{0.278}Zr_{0.005}O_2$, 7 parts by mass of acetylene black, 2 parts by mass of polyvinylidene fluoride and an appropriate amount of N-methyl-2-pyrrolidone (NMP). Next, a positive electrode mixture layer was formed by coating the positive electrode mixture slurry on both surfaces of a positive collector of an aluminum foil having a thickness of 15 μm, drying the thus obtained coated film, and compressing the resultant coated film. A positive electrode was obtained by cutting the collector having the positive electrode mixture layer formed on the both surfaces thereof into a prescribed electrode size, and connecting an aluminum lead to an exposed portion of the surface of the collector. The 100 nm or less pores volume of the positive electrode active material was 2 $mm^3$/g.

[Production of Negative Electrode]

A first slurry was prepared by blending 2 parts by mass of carbon black having a BET specific surface area of 39 $m^2$/g (carbon material A), 0.3 parts by mass of carboxymethyl cellulose sodium (CMC-Na), 1 part by mass of styrene butadiene rubber (SBR) and an appropriate amount of water, and mixing the resultant using a thin-film spin system high-speed mixer ("FILMIX" manufactured by PRIMIX Corporation) at a peripheral speed of 40 m/s. Next, a second slurry was prepared by blending 98 parts by mass of graphite having a BET specific surface area of 5.8 $m^2$/g, 0.7 parts by mass of CMC-Na and an appropriate amount of water, and mixing the resultant using a homodisper ("HOMODISPER" manufactured by PRIMIX Corporation) at a peripheral speed of 1.5 m/s. Subsequently, a negative electrode mixture slurry was prepared by mixing the first slurry and the second slurry using the homodisper at a peripheral speed of 1.5 m/s. Next, a negative electrode mixture layer was formed by coating the negative electrode mixture slurry on both surfaces of a negative collector of a copper foil having a thickness of 10 μm, drying the thus obtained coated film, and compressing the resultant coated film. A negative electrode was obtained by cutting the collector having the negative electrode mixture layer formed on the both surfaces into a prescribed electrode size, and connecting a nickel lead to an exposed portion of the surface of the collector. The negative electrode had a thickness of 60 μm in a portion where the negative electrode mixture layer was formed, and assuming that the negative electrode mixture layer was divided into two portions at the center in the thickness direction, a ratio of a content of the carbon material A in the portion closer to the collector to a content of the carbon material A in the surface portion of the mixture layer (a carbon material content ratio) was 1.1.

A ratio of a coverage of the particle surface of the graphite with SBR to a coverage of the particle surface of the carbon black with SBR (SBR coverage ratio) was 0.8. The SBR coverage ratio was obtained, as described above, through the SEM/EDX observation performed after staining the negative electrode mixture layer. The carbon black was in the form of secondary particles that were formed of agglomerated primary particles, and had a volume average particle diameter measured according to the laser diffraction method, that is, an average particle diameter measured using a laser diffraction/scattering particle diameter distribution analyzer ("LA-960" manufactured by HORIBA, Ltd.) (a median diameter at which the cumulative volume is 50% in the particle diameter distribution; hereinafter, the same applies to the graphite) of 0.2 μm. Besides, the graphite had an average particle diameter measured by the same method of 13 μm.

[Preparation of Non-aqueous Electrolyte]

Ethylene carbonate (EC) and dimethyl carbonate (DMC) were mixed in a volume ratio of 3:7 under an argon atmosphere. A non-aqueous electrolyte was prepared by dissolving $LiPF_6$ in the thus obtained mixed solvent at a concentration of 1 mol/L.

[Production of Battery]

A wound electrode assembly was produced by spirally winding the positive electrode and the negative electrode with a separator of a microporous polyethylene film disposed therebetween. The electrode assembly was housed in a closed-end cylindrical battery case body under a nitrogen atmosphere, the non-aqueous electrolyte was poured thereinto, and the opening of the battery case body was sealed with a gasket and a sealing assembly to produce a cylindrical non-aqueous electrolyte secondary battery.

Example 2

A negative electrode and a non-aqueous electrolyte secondary battery were produced in the same manner as in Example 1 except that carbon black having a BET specific surface area of 38 $m^2$/g and an average particle diameter of 10 μm was used as the carbon material A.

Example 3

A first slurry and a negative electrode mixture slurry were prepared in the same manner as in Example 1 except that the blending amount of carbon black was changed to 3 parts by mass, and a first negative electrode mixture layer having a thickness of 40 μm was formed on both surfaces of a negative collector of a copper foil. Subsequently, a first slurry and a negative electrode mixture slurry were prepared in the same manner as in Example 1 except that the blending amount of carbon black was changed to 1 part by mass, and a second negative electrode mixture layer having a thickness of 40 μm was formed on the first negative electrode mixture layer. Then, a negative electrode and a non-aqueous electrolyte secondary battery were produced in the same manner as in Example 1. The negative electrode had a thickness of 60 μm, and a carbon material content ratio of 0.7.

Example 4

A negative electrode and a non-aqueous electrolyte secondary battery were produced in the same manner as in Example 1 except that two positive electrode active materials described below and trilithium phosphate were used as positive electrode active materials. Each positive electrode active material was lithium-containing transition metal oxides respectively represented as shown below.

100 nm or less pores volume of first positive electrode active material ($Li_{1.054}Ni_{0.188}Co_{0.565}Mn_{0.188}Zr_{0.005}O_2$): 20 mm$^3$/g 100 nm or less pores volume of second positive electrode active material ($Li_{1.067}Ni_{0.498}Co_{0.199}Mn_{0.299}Zr_{0.005}O_2$): 2 mm$^3$/g A content ratio of the first positive electrode active material to the total amount of the first positive electrode active material and the second positive electrode active material was 10 mass %, and a content of trilithium phosphate was 2 mass % based on the total amount of the first positive electrode active material A1 and the second positive electrode active material B1.

Comparative Example 1

A negative electrode and a non-aqueous electrolyte secondary battery were produced in the same manner as in Example 1 except that a negative electrode mixture slurry was prepared by blending 2 parts by mass of acetylene black having a BET specific surface area of 39 m$^2$/g, 1 part by mass of CMC-Na, 1 part by mass of SBR, 98 parts by mass of graphite having a BET specific surface area of 5.8 m$^2$/g and an appropriate amount of water, and mixing the resultant using a homodisper at a peripheral speed of 1.5 m/s.

Comparative Example 2

A negative electrode and a non-aqueous electrolyte secondary battery were produced in the same manner as in Example 1 except that flaky carbon having a BET specific surface area of 8.3 m$^2$/g was used instead of the carbon black having a BET specific surface area of 39 m$^2$/g.

The non-aqueous electrolyte secondary batteries described above were evaluated for the input characteristic by the following method, and the results of the evaluation are shown in Table 1. In Table 1, the BET specific surface areas and the like of the graphite and the carbon material A are also shown together with the evaluation results.

[Input Characteristic Test]

A test battery was used to be charged to 60% of the rating capacity thereof at a current density of 0.2 It at a temperature condition of 25° C., and allowed to stand at 75° C. for 22 hours. Thereafter, constant current charge was carried out to a voltage of 4.1 V at a temperature of 25° C., and then constant voltage charge was carried out at a constant voltage of 4.1 V to a current density of 0.05 It. It is noted that a discharge capacity in the constant current discharge carried out at a current density of 0.2 It to a voltage of 2.5 at a temperature of 25° C. was taken as the rating capacity of each test cell.

Next, the battery was charged at a current density of 0.2 It to a half of the rating capacity. Thereafter, the battery was charged at a constant current density for 10 seconds, and a voltage was measured when the charge for 10 seconds was completed. The voltage was measured with the current density changed in a range of 0.2 to 1.5 It, and the thus measured voltages were plotted at the respective current densities to obtain a voltage-current line, based on which a current value corresponding to a voltage of 4.3 V was calculated. The thus obtained current value corresponding to 4.3 V and the voltage value of 4.3 V were multiplied to obtain an input characteristic value.

TABLE 1

| | Negative Electrode | | | | | | |
|---|---|---|---|---|---|---|---|
| | Graphite | | Carbon Material | | | | |
| | Specific Surface Area | Average Particle Diameter | Specific Surface Area | Average Particle Diameter | SBR Coverage Ratio | Battery Input Characteristic | Remarks |
| Example 1 | 5.8 m$^2$/g | 13 μm | 39 m$^2$/g | 0.2 μm | 0.8 | 2.63 W | |
| Example 2 | 5.8 m$^2$/g | 13 μm | 38 m$^2$/g | 10 μm | 0.8 | 2.67 W | |
| Example 3 | 5.8 m$^2$/g | 13 μm | 39 m$^2$/g | 0.2 μm | 0.8 | 2.75 W | Carbon material mixing ratio: 0.7 |
| Example 4 | 5.8 m$^2$/g | 13 μm | 39 m$^2$/g | 0.2 μm | 0.8 | 2.82 W | Two positive electrode active materials used |
| Comparative Example 1 | 5.8 m$^2$/g | 13 μm | 39 m$^2$/g | 0.2 μm | 1.2 | 2.47 W | |
| Comparative Example 2 | 5.8 m$^2$/g | 13 μm | 8.3 m$^2$/g | 0.2 μm | 0.8 | 2.49 W | |

The batteries of Examples 1 to 4 are superior to the batteries of Comparative Examples 1 and 2 in the input characteristic. This is because the carbon material was covered with the binder in a larger amount than the graphite, and hence the effect of the binder to inhibit the charge discharge reaction was reduced. Since the carbon material having a large BET specific surface area has, on the surface thereof, small pores where the binder cannot enter, the charge discharge reaction can be probably performed inside even if the surface is covered with the binder.

In Example 2 in which the carbon material having a larger secondary particle diameter was used, a larger number of small pores where the binder could not enter were present on the surface, and therefore, a portion where the charge discharge reaction could be performed was increased, which probably further improved the input characteristic.

In Example 3 in which the carbon material covered with the binder was disposed in a smaller amount in the surface portion of the negative electrode mixture layer than in the portion closer to the collector, the input characteristic was further improved probably because the formation of a high-resistance film, which was otherwise formed through a reaction of a decomposed product from the positive electrode deposited on the surface of the negative electrode with the binder present on the carbon material, was suppressed.

In Example 4 in which the positive electrode containing the mixture of the specific positive electrode active materials including the positive electrode active material having a large pore volume and lithium phosphate was used, the input characteristic was improved because the positive electrode active material having a large pore volume was used. Besides, a decomposed product generated through a side reaction caused between the positive electrode active materials and the electrolyte was changed through the catalytic action of the lithium phosphate, and hence, the formation of the high-resistance film on the surface of the negative electrode was suppressed, which probably further improved the input characteristic.

REFERENCE SIGNS LIST 10 non-aqueous electrolyte secondary battery
11 positive electrode
11a positive collector
11b positive electrode mixture layer
12 negative electrode
12a negative collector
12b negative electrode mixture layer
13 separator
14 electrode assembly
15 case body
16 sealing assembly
17, 18 insulating electrode plate
19 positive electrode lead
20 negative electrode lead
21 projecting portion
22 filter
23 lower vent member
24 insulating member
25 upper vent member
26 cap
27 gasket

The invention claimed is:

1. A negative electrode for a non-aqueous electrolyte secondary battery, comprising a negative collector, and a negative electrode mixture layer formed on the negative collector, wherein the negative electrode mixture layer contains graphite having an average particle diameter of 10 to 30 μm and a BET specific surface area of 1 to 10 $m^2/g$, a carbon material having a BET specific surface area larger than the BET specific surface area of the graphite and of 10 $m^2/g$ or more, and a hydrophobic binder, a coverage of particle surface of the carbon material with the binder is higher than a coverage of particle surface of the graphite with the binder, the negative electrode mixture layer includes a first layer and a second layer formed successively from a side of the negative collector, the first layer and the second layer contain the graphite, and a content of the carbon material in the first layer is higher than a content of the carbon material in the second layer.

2. The negative electrode for a non-aqueous electrolyte secondary battery according to claim 1, wherein a ratio of the coverage of particle surface of the graphite with the binder to the coverage of particle surface of the carbon material with the binder is 0.7 to 0.9.

3. The negative electrode for a non-aqueous electrolyte secondary battery according to claim 1, wherein the BET specific surface area of the carbon material is 30 $m^2/g$ or more.

4. The negative electrode for a non-aqueous electrolyte secondary battery according to claim 1, wherein an average particle diameter of the carbon material is 5 μm to 20 μm and is smaller than an average particle diameter of the graphite.

5. The negative electrode for a non-aqueous electrolyte secondary battery according to claim 1, wherein a content of the carbon material in the negative electrode mixture layer is 20 mass % or less based on a total mass of the graphite.

6. The negative electrode for a non-aqueous electrolyte secondary battery according to claim 1, wherein the binder contains styrene butadiene rubber.

7. A non-aqueous electrolyte secondary battery, comprising a negative electrode, a positive electrode, and a non-aqueous electrolyte, the negative electrode comprising a negative collector, and a negative electrode mixture layer formed on the negative collector, wherein the negative electrode mixture layer contains graphite, a carbon material having a BET specific surface area larger than a BET specific surface area of the graphite and of 10 $m^2/g$ or more, and a hydrophobic binder, a coverage of particle surface of the carbon material with the binder is higher than a coverage of particle surface of the graphite with the binder, the negative electrode mixture layer includes a first layer and a second layer formed successively from a side of the negative collector, the first layer and the second layer contain the graphite, and a content of the carbon material in the first layer is higher than a content of the carbon material in the second layer, and wherein the positive electrode contains a first positive electrode active material, a second positive electrode active material, and a phosphate compound; the first positive electrode active material has a pore volume, of pores each having a pore diameter of 100 nm or less, per mass of 8 $mm^3/g$ or more; the second positive electrode active material has a pore volume, of pores each having a pore diameter of 100 nm or less, per mass of 5 $mm^3/g$ or less; and the pore volume, of pores each having a pore diameter of 100 nm or less, per mass of the first positive electrode active material is 4 or more times the pore volume, of pores each having a pore diameter of 100 nm or less, per mass of the second positive electrode active material.

8. A non-aqueous electrolyte secondary battery, comprising the negative electrode according to claim 1, a positive electrode, and a non-aqueous electrolyte, wherein
the positive electrode contains a first positive electrode active material, a second positive electrode active material, and a phosphate compound; the first positive electrode active material has a pore volume, of pores each having a pore diameter of 100 nm or less, per mass of 8 $mm^3/g$ or more; the second positive electrode active material has a pore volume, of pores each having a pore diameter of 100 nm or less, per mass of 5 $mm^3/g$ or less; and the pore volume, of pores each having a pore diameter of 100 nm or less, per mass of the first positive electrode active material is 4 or more times the pore volume, of pores each having a pore diameter of 100 nm or less, per mass of the second positive electrode active material.

\* \* \* \* \*